United States Patent
Flynn

[11] 3,846,056
[45] Nov. 5, 1974

[54] TURRET LOWERING MECHANISM
[75] Inventor: Joseph C. Flynn, Bridgeton, N.J.
[73] Assignee: Wheaton Industries, Millville, N.J.
[22] Filed: Feb. 26, 1973
[21] Appl. No.: 335,696

Related U.S. Application Data
[62] Division of Ser. No. 189,978, Oct. 18, 1971, abandoned.

[52] U.S. Cl..... 425/154, 425/450 R, 425/DIG. 205, 425/DIG. 209, 425/DIG. 231
[51] Int. Cl............................................. B29c 1/16
[58] Field of Search .......... 425/151, 154, 246, 324, 425/324 B, 348, 349, 350, 450, DIG. 205, DIG. 209, DIG. 231, 242 B

[56] References Cited
UNITED STATES PATENTS
2,290,129  7/1942  Moreland............................ 425/246
3,590,426  7/1971  Nowicki............................... 425/246
3,702,750  11/1972  Veneria .............................. 425/246

Primary Examiner—Andrew R. Juhasz
Assistant Examiner—David B. Smith
Attorney, Agent, or Firm—Paul & Paul

[57] ABSTRACT

Lever members associated with a plurality of independently operated mold halves include cam members acting in the mold closure direction on a centrally disposed turret which is otherwise urged in the opposite direction. Preferably, this invention facilitates set-up of an injection blow molding machine and prevents component damage by mold closure before the indexing turret is fully seated.

4 Claims, 2 Drawing Figures

3,846,056
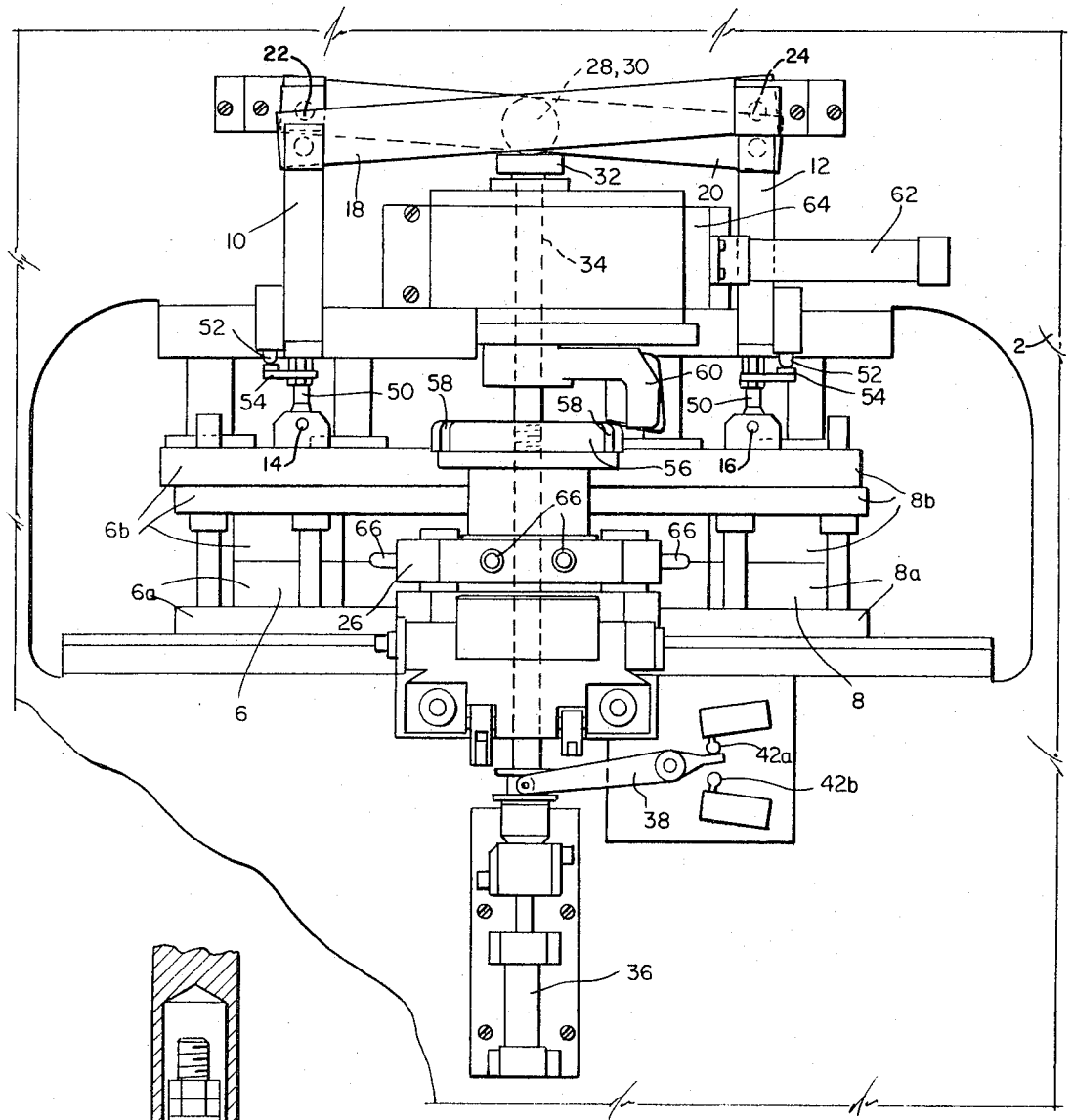
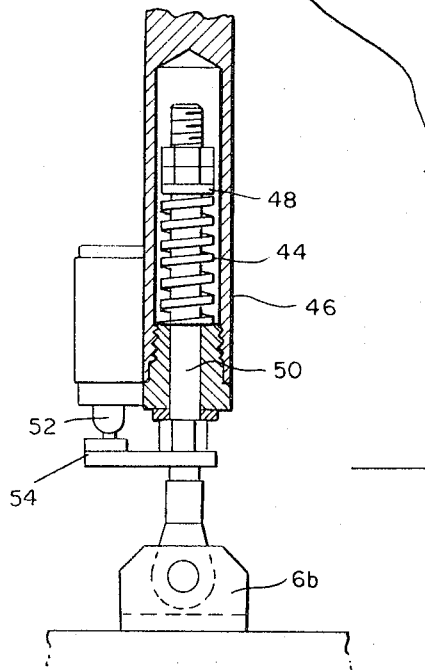
Fig. 1
Fig. 2

TURRET LOWERING MECHANISM

This is a division, of application Ser. No. 189,978 filed Oct. 18, 1971 now abandoned.

This invention relates to a mechanism for lowering a turret in conjunction with the closing movements of mold sets associated therewith whereby damage to turret components by out of phase mold closure is avoided. More particularly, this invention relates to an improvement in injection blow molding machines wherein the turret thereof is lowered in conjunction with any of a plurality of independent mold closure mechanisms.

In one conventional type of injection blow molding machine, the turret mechanism is used to transfer injection molded parisons from an injection mold station to a blow mold station and then to one or more idle stations. The mold sets of such apparatus are radially disposed from the turret axis and consist respectively of a stationary mold half and a movable mold half. Typically, the movable mold half moves upward to open the mold and simultaneously therewith the turret is raised so as to remove the injection molded parisons and blown bottles from the stationary mold halves and to permit indexing.

Numerous methods have been used to close and to open the molds by moving the movable mold halves and to raise and to lower the turret associated therewith.

In one common form of injection blow molding machines, independent means, such as separate hydraulic cylinders, are used to open and to close the two mold sets, i.e. the parison and blow mold sets, independently. These hydraulic cylinders are located generally along the center line of the mold sets and in the mold opening and mold closing direction. A lever member connected to the movable mold half of one of the mold sets and extending to a fixed point on the other side of the turret axis has been used to raise and to lower the turret by a pivotal connection with a shaft extending along the turret axis and connecting to the lever member at a point midway between its connection to the movable mold half or a connecting member extending therefrom and to the fixed point at which it is usually attached to a frame member of the injection blow molding machine.

In this and in other turret raising and lowering mechanisms, certain difficulties are encountered which may result in damage to components, machine malfunction, poor production, etc. One such problem is the lowering of mold halves when the turret is not in its lowest position wherein the mandrels or core members projecting therefrom are seated in the stationary mold halves. In such an event, the movable mold half comes down onto the mandrels or core rods causing physical damage thereto.

Further difficulty is encountered in maintenance of such machines in that in order to raise and lower the turret during set up it is also necessary to operate one of the hydraulic cylinders operating one of the mold sets. Further, it is difficult to lower the turret to ensure seating of the mandrels in the stationary mold halves while keeping the movable mold half in the raised position.

In view of these problems, it is the general object of the present invention to provide an improved mechanism for lowering the turret in a machine of the type described.

More particularly, it is an object of this invention to provide an improved mechanism for use in an injection blow molding machine for lowering the turret head thereof in such a manner as to avoid possible damage by mold closure and to facilitate set up thereof by permitting turret lowering independent of mold movement.

These and other objects which will become apparent from the following description, are met, in accordance with the present invention, by lever arms linked to the movable mold halves of a plurality of mold sets disposed radially of the axis of the turret, the lever arms being pivoted at a fixed point such that a cam located on each such lever arm moves in conjunction with the mold opening and closing movement and during the mold closing movement engages a member associated with the turret so as to move the turret in conjunction therewith. The turret is moved in the opposite direction by a biasing means, such as a hydraulic cylinder. Engagement of the turret with a plurality of these lever arms, one being associated with each mold set, results in turret displacement toward its mold closed position in conjunction with the movable mold half closest to the full closed position. In this way, turret components, such as mandrels disposed radially therefrom, as are commonly used in injection blow molding machines, are not damaged by mold closure of any mold set prior to seating of the turret in its mold closed position.

In the preferred form of the present invention, it is used in conjunction with an injection blow molding machine mounted in a twin plate frame structure with a turret head conventionally disposed in an opening in the twin plate frame and having on either side thereof mold sets, each consisting of a stationary mold half and a movable mold half, one of the mold sets being a parison mold set and the other being a blow mold set. Between molding operations, in which a parison is injected molded at one mold station and a parison formed in a previous cycle is blown into a bottle at the blow mold station, the turret, and its associated core rods or mandrels with parisons and blown bottles thereon, is raised out of its mold closed position to permit indexing thereof. A hydraulic cylinder urges the turret into its mold open position or upwardly in the conventional machine. Acting against this bias and engaging the turret shaft are cams acting in the direction opposite that of the hydraulic cylinder bias. These cams are mounted on lever arms, one end of each of which is pivoted to a fixed point on the frame structure and the other end of which is connected to a connecting member associated with a movable mold half of one of the mold sets. Two such lever arms and cams insure that the turret is always lowered in conjunction with the lowest of the movable mold halves at any given time.

For a better understanding of the present invention, reference is made to the following complete description, taken in conjunction with the appended claims and the drawings in which:

FIG. 1 is a schematic side view of a twin plate frame injection blow molding machine in which is incorporated the turret lowering mechanism of the present invention; and FIG. 2 is a sectional enlarged view of one component of the apparatus shown in FIG. 1.

Referring more specifically to FIG. 1, there is shown a partial view of one side of the parallel twin plate frame 2 with an opening 4 therein in which is mounted injection and parison mold sets 6 and 8, respectively, each of these mold sets including stationary members 6a and 8a and movable members 6b and 8b respectively. Movable mold halves 6b and 8b (together with associated mounting members) are operated independently, such as by hydraulic cylinders (not shown) disposed between the twin plates of twin plate frame 2 and not seen in FIG. 1. Attached to the uppermost mounting members of movable mold halves 6b and 8b are connecting members 10 and 12 pivotally connected at pivot points 14 and 16.

Pivotally connected at the opposite or top ends of connecting members 10 and 12 are lever members 18 and 20, respectively. Lever members 18 and 20 are in turn pivotally fastened at their opposite ends to twin plate frame structure 2 at fixed points 22 and 24 displaced substantially from the pivotal connections of connecting members 10 and 12 with lever members 18 and 20, respectively, in a direction lying in a plane perpendicular to the axis of the turret 26 to be lowered, in accordance with the present invention, in conjunction with the mold closure movement of movable mold halves 6b and 8b.

To accomplish this turret lowering function, cams 28 and 30 mounted on lever arms 18 and 20, respectively, intermediate the ends thereof, engage bearing member 32 disposed at the end of an axial shaft 34 of turret 26.

At the opposite or lower end of shaft 34, hydraulic cylinder 36 urges shaft 34 and turret 26 upwardly by counterbalancing the weight thereof. Sensing arm 38 pivotally connected to frame 2 on shaft 40 contacts switching element 42a when turret 26 is in its lowermost position and sensing element 42b when turret 26 is in its uppermost position. Electrical contacts made through sensing elements 42a and 42b by electrical means, not shown, may be used as signals to permit the start of the next sequencing function following turret lowering or turret raising, respectively, or may be used directly to initiate such subsequent functions.

Associated with each of the connecting members 10, and as better seen in the sectional, enlarged view of FIG. 2, is housing 46 and spring retainer 48 at the upper end of connecting rod 50. Connecting rod 50 is attached pivotally to movable mold half mounting member 6b and is vertically movable in the lower end of housing 46. Associated with housing 46 is a contact sensing element 52. Associated with shaft 50 is contact sensing element 54. Spring tension in spring member 44, set by selection of spring constant and amount of spring compression is such that any overload encountered by lever member 18, or associated cam 28, in lowering turret 26 causes housing 46 to tend to move upwardly with respect to connecting rod 50 thereby compressing spring 48 and breaking contact between contact sensing elements 52 and 54. Breaking of contact between contact sensing elements 52 and 54, through an electrical sensing means not shown, signals that excessive resistance force has been encountered in attempted lowering of turret 26 and/or automatically interrupts machine cycle or operation so that the cause of the excessive force can be determined and eliminated.

Although not necessary to an understanding of the present invention, it should be understood that numerous other mechanisms are necessary to the proper function of the injection blow molding machine shown in FIGS. 1 and 2. These additional mechanisms will include, for example, the heated extruder for feeding the thermoplastic material to be formed and delivering the heated thermoplastic material in moldable form at the proper point in the sequential operation of the machine, into the injection or parison molds thereof. Various types of such melt delivery means are used and are well known; illustration thereof is therefore omitted from FIGS. 1 and 2.

Similarly, numerous mechanisms are known for indexing or rotating turret 26 between molding cycles. Such indexing of course requires that turret 26 be in a raised position and that mold sets 6 and 8 be opened. One such indexing means, which is fully described in copending application Ser. No. 104,359, filed Jan. 6, 1971 issued as U.S. Pat. No. 3,706,517 on Dec. 19, 1972 of common assignment herewith, is shown schematically in FIG. 1. More specifically, a raised head member 56 associated with turret 26 includes a plurality of indexing slots 58 which engage indexing arm 60 upon raising of turret 26. While turret 26 is in the raised position and molds 6 and 8 are open turret 26 is indexed by rotary movement of indexing arm 60, such motion being imparted thereto by a hydraulic cylinder disposed in housing 62 acting through a motion transmitting means disposed in housing 64.

Core rods or mandrels 66 project radially from turret 26 with an angular displacement therebetween corresponding to that between adjacent indexing slots 58 on raised head member 56. Mold sets 6 and 8 are also angularly displaced with respect to the axis of turret 26 by an amount corresponding to the displacement between adjacent core rod sets 66 so that in each cycle of the machine a single or a set of core rods 66 are disposed in the mold cavities of one mold set 66 while a second individual or core rod set 66 is disposed in mold set 8.

Because core rods 66 actually project into the mold cavities of mold sets 6 and 8 when these molds are closed and because the neck portions of the core rods or mandrels 66 must mate with corresponding neck closures of mold sets 6 and 8 with very close tolerance to provide acceptable moldability, closure of either of mold sets 6 and 8 with turret 26 and/or core rods or mandrels 66 slightly out of position or not in the full lowered position will cause damage of core rods or mandrels 66 by the movable mold members 6b and/or 8b. Because core rods or mandrels 66 are typically made to very close tolerances and necessarily have smooth finishes and fragile geometry, such damage is difficult to avoid and expensive to remedy.

It is for that reason that the present invention has been developed. In the present invention, turret 26 is always moved toward its lowest position, or the end of its axial stroke corresponding to the mold closed position of the machine, in conjunction with that movable mold half which is also farthest displaced toward the mold closure position. It is therefore necessarily positioned at the end of its axial stroke when either of mold sets 6 and 8 are fully closed. Thus such damage is avoided. Furthermore, careful balancing and phasing of the independent hydraulic cylinders which provide the mold closure motion to mold sets 6 and 8, in order to avoid such damage, is rendered unnecessary by the present invention.

As both movable mold halves 6b and 8b move upwardly to open molds 6 and 8, turret 26 is also moved upwardly under the influence of a biasing means acting in a direction opposite that force produced by the caming members 28 and 30 associated with movable mold halves 6b and 8b. More specifically, this biasing means, in the preferred form of the present invention, comprises hydraulic cylinder for applying a constant force to the turret 36 acting upwardly on shaft 34. By virtue of the disposition of cam members 28 and 30 at the halfway point between the ends of lever members 18 and 20, turret 26 is permitted to be raised approximately half the distance of the upward movement of the movable mold half 6b and 8b. Thus core rods or mandrels 26 and any parisons or blown bottles mounted thereon are free of interference both with stationary mold halves 6a and 8a and movable mold halves 6b and 8b, thereby permitting the indexing of turret 26.

As a further feature of the present invention, during set-up of the injection blow molding machine shown in FIG. 1, when it is desirable to adjust precisely the position of core rods or mandrels 66 in the neck portions of stationary mold halves 6a and 8a, turret 26 can be lowered without closing molds 6 and 8 simply by relieving the pressure on hydraulic cylinder 36 or otherwise overcoming the biasing means tending to counteract the thrust of cam members 28 and 30.

In still another feature of the present invention, spring means 44 and connecting members 10 and 12, along with contact sensing element 52 and 54 indicate when an overload has been encountered in lowering turret 26 and thereby permit correction of problems causing such overload while preventing damage which might otherwise occur due to such overload.

While it should be understood that the present invention has been described, for purposes of convenience and illustration, and also to comply with certain formal requirements of the patent laws, with reference to the preferred embodiment thereof, numerous other embodiments and applications of the present invention are possible, all of which will be obvious to one skilled in the art. For example, spring member 48 and sensing elements 52 and 54 may be ommitted if that particular safety feature is deemed not necessary to any particular application of the present invention.

More generally, the invention need not be limited to injection blow molding machines, nor to turret type machines, the motion of which is vertically oriented or the number of mold sets of which is limited to 2, so long as the plurality of mold sets to be opened and close contemporaneously with the raising and lowering of a centrally disposed turret are radially displaced therefrom and are opened and closed by the motion of a movable mold half, the direction of motion of which parallels the axial motion of the turret necessary to facilitate indexing thereof. In any event, the lever members associated with movable mold halves and through which motion is imparted to the turret member in the direction parallel to the mold closure motion must extend from the point of connection with the movable mold half to a fixed point spaced therefrom in a direction lying in a plane perpendicular to the axis of the turret. It will be equally obvious that all of the connections between the movable mold halves, connecting members, and lever members, associated therewith, as well as the connection of the lever members to the fixed points displaced therefrom, must be such as to permit movement of said connecting members and said lever members in conjunction with the movement of said movable mold halves. Ordinarily, this is provided by pivotal connection means such as those shown in FIG. 1.

Having in mind these possible alternatives, the claims appended hereto should not be interpreted as being limited to the embodiments of the invention described and illustrated. Instead, these claims are intended to cover all of the numerous equivalent forms of the present invention and to the numerous other embodiments of the present invention which are within the true spirit and scope thereof, and which will be obvious to those skilled in the art.

I claim:

1. In a machine having a turret and a plurality of independent mold sets disposed radially of said turret each of said mold sets having a stationary mold half and a movable mold half, said movable mold half including means for moving said movable mold half in a path parallel to the axis of said turret toward and away from said stationary mold half to close and to open, respectively, said mold set, the improvement comprising a mechanism for moving said turret along its axis in conjunction with the movement of said movable mold halves in the closing direction thereof only, said mechanism comprising a. biasing means for urging said turret along its axis in a direction parallel that of said movable mold members when moving away from said stationary mold members,
   b. connecting members extending from each of said movable mold halves in a path generally coincident with the direction of movement of said respective movable mold half during the movement thereof away from said respective stationary mold halves,
   c. lever members extending from each of said connecting members, at the end thereof opposite that at which it is connected to said respective movable mold half, to fixed points spaced therefrom in a direction lying in a plane perpendicular to the axis of said turret,
   d. all of the connections between said movable mold halves, said connecting members, said lever members and said fixed points being such as to permit movement of said connecting members and said lever members in conjunction with the movement of said movable mold halves,
   e. each of said lever members having, at a point thereon intermediate its ends at which it is connected to said respective connecting member and said respective fixed point, a cam,
   f. said turret including a cam receiving member for engaging all of the cams of said respective lever members on the peripheral portions thereof disposed in a direction from the centers thereof opposite that in which said turret is urged by said biasing means, said improved machine having two mold sets, the lever member associated with each of which being connected to a fixed point lying in a plane perpendicular to the axis of said turret and including said lever member when said movable mold connected to said lever member is at the end of its movement away from said stationary mold half, wherein said cams are positioned on each of said lever members at a point midway between the points at which said respective lever member is connected to said respective connecting member and to said respective fixed point, wherein said machine is an injection blow molding machine having a twin plate press frame, said fixed points being mounted on said frame, wherein said biasing means comprises a hydraulic cylinder for applying a constant force to said turret along the axis thereof, wherein said connecting member includes means for sensing excessive resistance force encountered in the axial movement of said turret in the direction parallel that of said movable mold halves during the movement thereof toward said stationary mold halves.

2. In a machine having a turret and a plurality of independent mold sets disposed radially of said turret each of said mold sets having a stationary mold half and a movable mold half, said movable mold half including means for moving said movable mold half in a path parallel to the axis of said turret toward and away from said stationary mold half to close and to open, respectively, said mold set, the improvement comprising a mechanism for moving said turret along its axis in conjunction with the movement of said movable mold halves in the closing direction thereof only, said mechanism comprising a. biasing means for urging said turret along its axis in a direction parallel that of said movable mold members when moving away from said stationary mold members,
  b. connecting members extending from each of said movable mold halves in a path generally coincident with the direction of movement of said respective movable mold half during the movement thereof away from said respective stationary mold halves,
  c. lever members extending from each of said connecting members, at the end thereof opposite that at which it is connected to said respective movable mold half, to fixed points spaced therefrom in a direction lying in a plane perpendicular to the axis of said turret,
  d. all of the connections between said movable mold halves, said connecting members, said lever members and said fixed points being such as to permit movement of said connecting members and said lever members in conjunction with the movement of said movable mold halves,
  e. each of said lever members having, at a point thereon intermediate its ends at which it is connected to said respective connecting member and said respective fixed point, a cam,
  f. said turret including a cam receiving member for engaging all of the cams of said respective lever members on the peripheral portions thereof disposed in a direction from the centers thereof opposite that in which said turret is urged by said biasing means, wherein said connecting member includes means for sensing excessive resistance force encountered in the axial movement of said turret in the direction parallel that of said movable mold halves during the movement thereof toward said stationary mold halves.

3. In a machine having a turret and a plurality of independent mold sets disposed radially of said turret each of said mold sets having a stationary mold half and a moveable mold half, said moveable mold half including means for moving said moveable mold half in a path parallel to the axis of said turret toward and away from said stationary mold half to close and to open, respectively, said mold set, the improvement comprising a mechanism for moving said turret along its axis in conjunction with the movement of said moveable mold halves in the closing direction thereof only, said mechanism comprising a. biasing means for urging said turret along its axis in a direction parallel that of said moveable mold members when moving away from said stationary mold members,
  b. connecting members extending from each of said moveable mold halves in a path generally coincident with the direction of movement of said respective moveable mold half during the movement thereof away from said respective stationary mold halves,
  c. lever members extending from each of said connecting members, at the end thereof opposite that at which it is connected to said respective moveable mold half, to fixed points spaced therefrom in a direction lying in a plane perpendicular to the axis of said turret,
  d. all of the connections between said moveable mold halves, said connecting members, said lever members and said fixed points being such as to permit movement of said connecting membets and said lever members in conjunction with the movement of associated said moveable mold halves, and all said connections comprising means for permitting movement of each moveable mold half in a mold closing direction independent of the movement of the other mold half,
  e. each of said lever members having, at a point thereon intermediate its ends at which it is connected to said respective connecting member and said respective fixed point, a cam,
  f. said turret including a cam receiving member for engaging all of the cams of said respective lever members on the peripheral portions thereof disposed in a direction from the centers thereof opposite that in which said turret is urged by said biasing means, wherein said connecting member includes means for sensing excessive resistance force encountered in the axial movement of said turret in the direction parallel that of said moveable mold halves during the movement thereof toward said stationary mold halves.

4. The apparatus of claim 3, wherein said sensing means is independently associated with each said mold, and including means for preventing the closing of a moveable mold half with its associated fixed mold half, independently operative relative to the other said mold half, upon said moveable mold half meeting with excessive resistance.

* * * * *